No. 618,042. Patented Jan. 17, 1899.
J. D. DARLING.
GALVANIC BATTERY.
(Application filed Oct. 16, 1897.)

(No Model.)

WITNESSES:
James H. Bell
Randolph Sailer

INVENTOR:
James D. Darling.
By Raley & Paul
Attorneys.

UNITED STATES PATENT OFFICE.

JAMES D. DARLING, OF PHILADELPHIA, PENNSYLVANIA, ASSIGNOR TO THE HARRISON BROS. & COMPANY, INCORPORATED, OF SAME PLACE.

GALVANIC BATTERY.

SPECIFICATION forming part of Letters Patent No. 618,042, dated January 17, 1899.

Application filed October 16, 1897. Serial No. 655,379. (No model.)

*To all whom it may concern:*

Be it known that I, JAMES D. DARLING, of Philadelphia, in the State of Pennsylvania, have invented certain new and useful Improvements in Galvanic Batteries, whereof the following is a specification, reference being had to the accompanying drawings.

Figure 1:
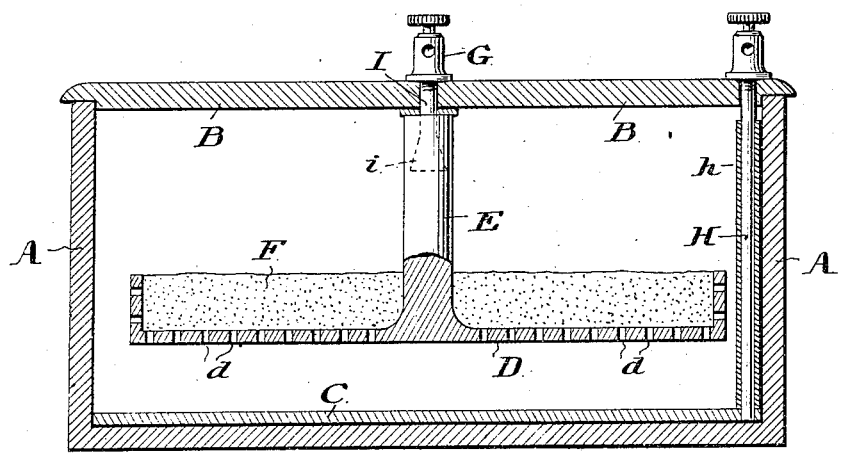
Figure 2:
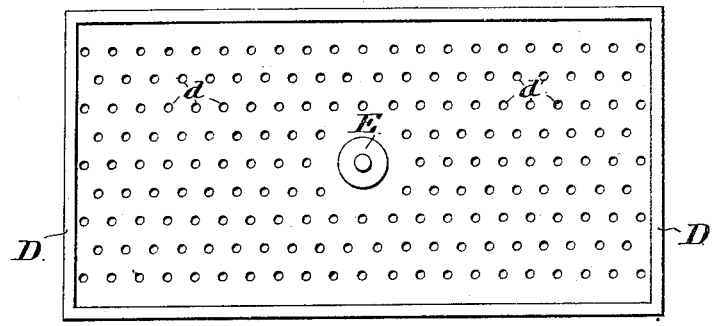
Figure 3:
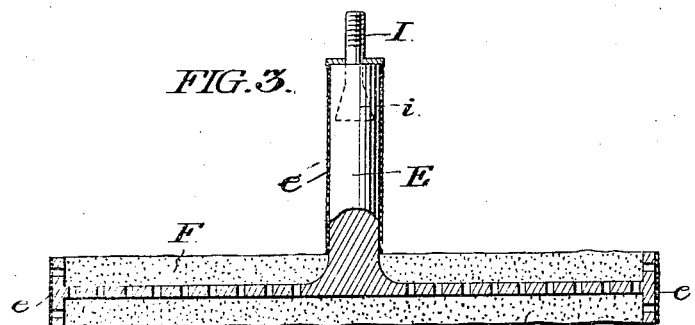

In said drawings, Figure 1 represents a vertical central section through a battery embodying my invention. Fig. 2 is a top or plan view of the negative element, and Fig. 3 is a vertical central section of a modified form of said negative element.

My invention relates to primary batteries and is addressed to an organization of the elements thereof in the most advantageous manner for insuring economy and uniformity of action.

It is of course well known that the two elements of a battery should be in uniform proximity to one another and at the minimum distance which is consistent with proper action in other respects. Heretofore in primary batteries which have employed peroxid of lead for the negative element in conjunction with a positive element of amalgamated zinc the peroxid has been disposed in the shape of vertical rods or plates suspended from the top of the containing vessel, and in order to obtain the proper results, due to uniform distance between the elements, the amalgamated zinc element has also been suspended in the form of a plate or rod having its greatest length in a vertical direction. Whatever advantages this method of arrangement may have for the peroxid element, there is a serious objection thereto in the case of the amalgamated zinc element. Under the action of gravity the mercury tends to drift to the bottom, which results in the rapid eating away of the zinc. My present invention consists in such a disposition of the zinc element as to maintain its efficient surface in a uniformly-amalgamated condition, while at the same time the peroxid-of-lead element is so formed as to be capable of arrangement at a uniform distance therefrom throughout. This is accomplished by disposing of both plates in a horizontal direction and by constructing the zinc element of little vertical height or depth and of such size as to practically make a close fit with the walls of the jar or containing vessel.

Referring now to Figs. 1 and 2 of the drawings, A represents the jar or vessel, preferably of glass, and B the cover thereof, preferably of hard rubber.

C is the zinc element, consisting of a flat plate of uniform thickness closely fitting within the walls of the jar and adapted to rest evenly upon the bottom thereof. Said plate is of comparatively small vertical height or depth, as shown.

The negative element consists of a tray D, having perforations $d$, which supports a mass of peroxid of lead F. The tray D is supported by means of a central rod E, preferably made integral with the tray, the two being composed of antimonious lead. In the upper portion of the rod E is embedded a copper plug I, whose lower end is widened or outwardly flared, as indicated at $i$, so as to form a dovetailed joint. A convenient method of thus uniting the parts is to secure the plug, with its end $i$ protruding into the mold wherein the tray and rod are cast, so that they shall be practically an integral structure. The upper end of the plug I is threaded to receive a binding-post G for the positive terminal and is secured thereby to the cover B. The exposed parts of the tray and rod or those not covered by and in direct contact with the peroxid are insulated by means of an acid-proof varnish $e$ of any suitable character to prevent local action or attack upon the metal. A copper rod H extends down through the cover and has its lower end embedded in the zinc element, the exposed portions of said rod being protected by means of an insulating-coating $h$. At the upper end of the rod H, which extends through the cover, suitable connections are afforded for the negative terminal.

The zinc element may be amalgamated by pouring upon it a suitable quantity of mercury after it is placed within the jar, the zinc being maintained in a substantially horizontal position. The mercury therefore amalgamates uniformly with the zinc plate, there being no tendency for it to drift away from one portion more than another, and as the zinc plate is of comparatively small vertical depth or height the upper surface will always remain substantially and uniformly amalgamated. Any suitable electrolyte used in this class of batteries may be employed. It is thus obvious that when the battery is in operation the horizontal disposition of both plates permits them to be in substantially uniform proximity to the maximum extent, and the local action or irregular attack upon the zinc plate is minimized by reason of its uniformly-maintained amalgamation.

In Fig. 3 is shown a modified form of the positive element, which differs from that just described only in the fact that the peroxid is applied both to the top and bottom of the tray.

I am aware that the employment of peroxid of lead as an element in a primary battery is not new; and I am also aware that in secondary batteries the peroxid of lead employed as an element has been disposed in horizontal trays, neither of which features I claim, broadly; nor do I claim, broadly, the horizontally-disposed zinc element, my invention residing in the particular combination which I have specified and hereinafter point out. I have found that by the use of this system of construction a most efficient and permanent battery is obtained, whose action is very uniform and persistent. I am not aware that any one has heretofore pointed out or suggested the essential principle upon which these desirable qualities are obtained.

I claim—

The combination with an inclosing vessel, of an element in the form of a horizontal conducting-plate having a surface of peroxid of lead applied thereto, and an element of amalgamated zinc disposed in the form of a horizontal plate of comparatively small vertical height and fitting closely against the interior sides of the inclosing vessel, said elements being arranged with their proximate surfaces at a substantially uniform distance throughout.

JAMES D. DARLING.

Witnesses:
JAMES H. BELL,
G. HERBERT JENKINS.